(No Model.)
P. MEDART.
FRICTION CLUTCH.
No. 459,458. Patented Sept. 15, 1891.
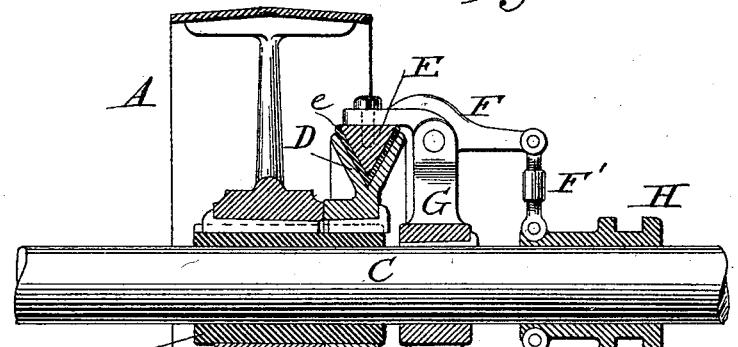
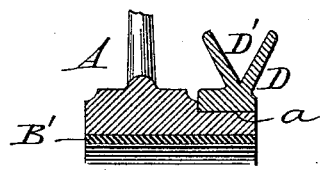
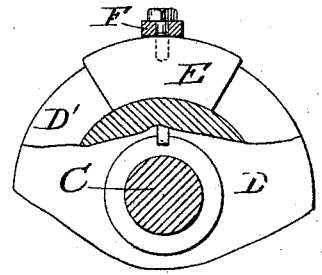
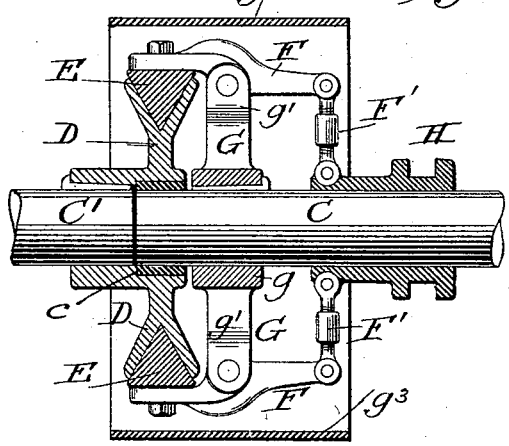
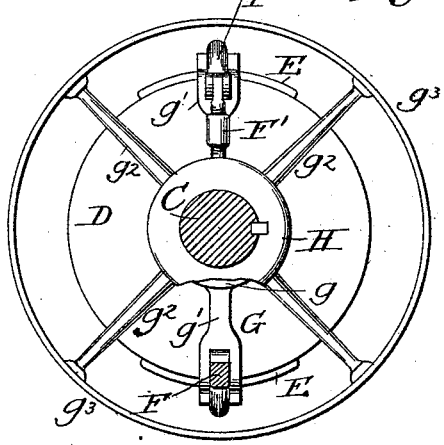
Witnesses
Inventor
PHILIP MEDART
by his attorneys
Baldwin, Davidson & Wight

UNITED STATES PATENT OFFICE.

PHILIP MEDART, OF ST. LOUIS, MISSOURI, ASSIGNOR OF ONE-HALF TO WILLIAM MEDART, OF SAME PLACE.

FRICTION-CLUTCH.

SPECIFICATION forming part of Letters Patent No. 459,458, dated September 15, 1891.

Application filed April 25, 1891. Serial No. 390,462. (No model.)

*To all whom it may concern:*

Be it known that I, PHILIP MEDART, a citizen of the United States, residing at St. Louis, in the State of Missouri, have invented certain new and useful Improvements in Friction-Clutches, of which the following is a specification.

My invention relates to friction-clutches for shafting and pulleys of the class in which friction blocks or shoes operated by a shipping-lever engage with a friction-surface connected with the pulley or to a shaft by which the pulley is carried.

The object of my present invention is to so organize the different parts of the clutch mechanism that they shall be secure and reliable in operation and may be readily applied to pulleys or shafts of ordinary construction.

According to my present invention I provide friction blocks or shoes carried by arms or levers pivoted to a frame secured to the shaft and operated by a sliding sleeve connected with the shipping-lever. The shoes engage with a friction-surface formed on a sheave, which is either connected to a sleeve loose on the shaft, but secured to the hub of the pulley, or which is secured directly to the pulley. This organization may be somewhat modified. For instance, the friction-surface may be formed on a block or sheave made integrally with the sleeve to which the pulley is secured. Where the clutch mechanism is used to connect a driving with a driven shaft, the sheave is formed with an extended hub or sleeve overlapping the ends of the shaft and is provided with a recess in which a separable sleeve or bushing is seated.

In the accompanying drawings, Figure 1 is a longitudinal central section through clutch mechanism embodying my invention, the driving-shaft being shown in elevation. Fig. 2 is a detail view in section showing particularly the formation of one of the friction-shoes and its connection with the shaft. Fig. 3 is a detail view in section showing a modification in which the sheave is mounted on the hub of the pulley. Fig. 4 is a vertical section showing my improved clutch mechanism for connecting a driving with a driven shaft, and Fig. 5 is an elevation of the same.

In Fig. 1 the pulley A is shown as keyed to a sleeve B, loosely mounted on the driving-shaft C; but it may be secured to the sleeve in any suitable way. The sleeve extends laterally from the hub of the pulley, and on this extension is secured the sheave D, which is provided with a peripheral V-shaped groove or channel D'. By this construction the hub of the pulley is relieved from wear and the sleeve may be readily replaced. The sleeve also provides a means for readily connecting the sheave with the pulley without modification of the pulley to accommodate the sheave-attaching devices. The sheave is shown as removable from the sleeve B for a similar purpose.

The friction-blocks E, of which two are shown in the drawings, but a greater number may be employed, are shaped to correspond with the channel D', so that when forced into the channel they shall tightly grasp the surface thereof. The friction-blocks may be of segmental or sector form, as shown in Fig. 2, and may be provided with an artificial wearing-surface $e$, as shown in Fig. 1. The blocks E are secured to the ends of levers F, pivoted to a frame G, secured to the driving-shaft C. The opposite ends of these levers are connected by adjustable hinged links F' to a sleeve H, free to slide on the shaft. This sleeve may be operated by a shipping-lever in the usual way.

In the position shown in the drawings the shoes are shown as engaging with the sheave. When the sleeve H is moved inwardly toward the sheave, the shoes are loosened and moved sufficiently to disengage their friction-surfaces from the surface of the channel D'. The pivots of the levers F may be so arranged as to insure the proper separation of the blocks from the sheave when operated to uncouple the clutch, and the links F' may be properly adjusted to insure the quick and secure operation of the mechanism.

In Fig. 3 the hub of the pulley is extended laterally and provided with a seat $a$ for the sheave D. The sheave may be secured in the seat by a key, set-screw, or other similar fastening device. Between the shaft and the hub of the pulley is interposed a wearing sleeve or bushing B', which in this instance may be made comparatively thin and may be connected with the pulley-hub by being tightly fitted therein or by the use of set-screws.

In Fig. 4 I have shown two shafts connected by my improved clutch mechanism. On the driving-shaft C is secured a frame G, which supports the shoe-carrying levers. This frame is shown as formed with a hub $g$, provided with laterally-projecting arms $g'$, in which the shoe-carrying levers F are pivoted. It may also be provided, as shown, with arms $g^2$, which support the annular casing $g^3$, which forms a guard or shield for the mechanism; but the arms $g^2$ may be omitted and the annular casing supported by extensions from the arms $g'$, if preferred. I have shown two shoe-carrying levers F; but a greater number may be employed. These levers may be connected by adjustable hinged links F' with a sliding sleeve H, supported on the shaft C and operated by a shipping-lever in the usual way.

The frame G is secured to the shaft C a short distance from its end to allow the hub of the sheave D to overlap the ends of the driving and the driven shafts. The sheave is shown as formed with an annular V-shaped groove or channel on its periphery, and the hub is extended, so as to overlap the ends of the shafts, being secured to the driven shaft C', and that end of the hub which extends over the driving-shaft C is recessed to receive a wearing sleeve or bushing $c$, which may be tightly fitted in the recess or secured to the hub in any suitable way. By this arrangement the two shafts are kept in line, and when the clutch is operated they are securely connected together and quickly disconnected, when desired.

I claim as my invention—

1. The combination of a shaft, a pulley, a sleeve interposed between the shaft and the pulley and with which the hub of the pulley is detachably connected, a sheave rigidly connected with the pulley and provided with an annular V-shaped recess on its periphery, correspondingly-shaped friction blocks or shoes engaging with the sheave, levers to which these shoes are connected, a frame to which the levers are pivoted and which is rigidly connected with the shaft, a sliding sleeve, and adjustable connections between this sleeve and the shoe-carrying levers.

2. The combination of a sheave having a V-shaped annular channel in its periphery, correspondingly-shaped friction-shoes engaging with the sheave, levers to which these shoes are connected, a frame to which the levers are pivoted, a sliding sleeve, and adjustable connections between the sliding sleeve and the shoe-carrying levers.

In testimony whereof I have hereunto subscribed my name.

PHILIP MEDART.

Witnesses:
B. WASHINGTON MILLER,
LLOYD B. WIGHT.